United States Patent Office 3,528,782
Patented Sept. 15, 1970

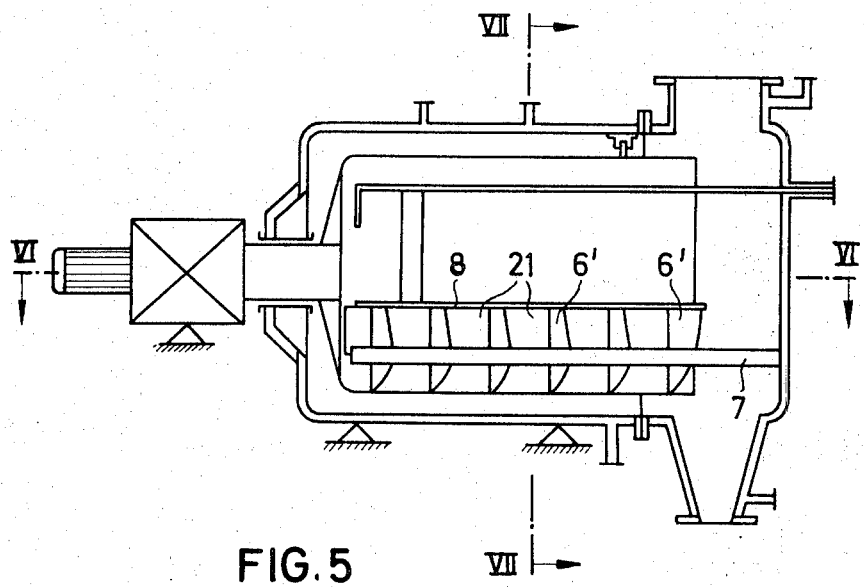
FIG. 5
FIG. 6
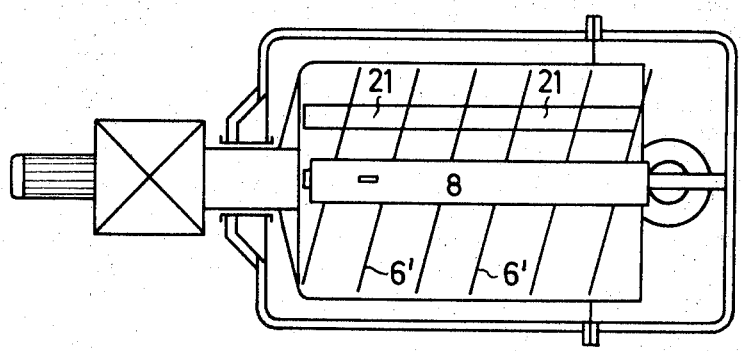

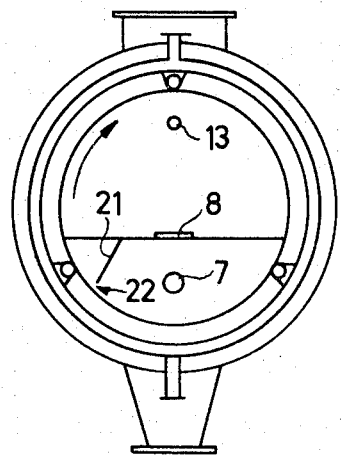
FIG. 7
FIG. 8
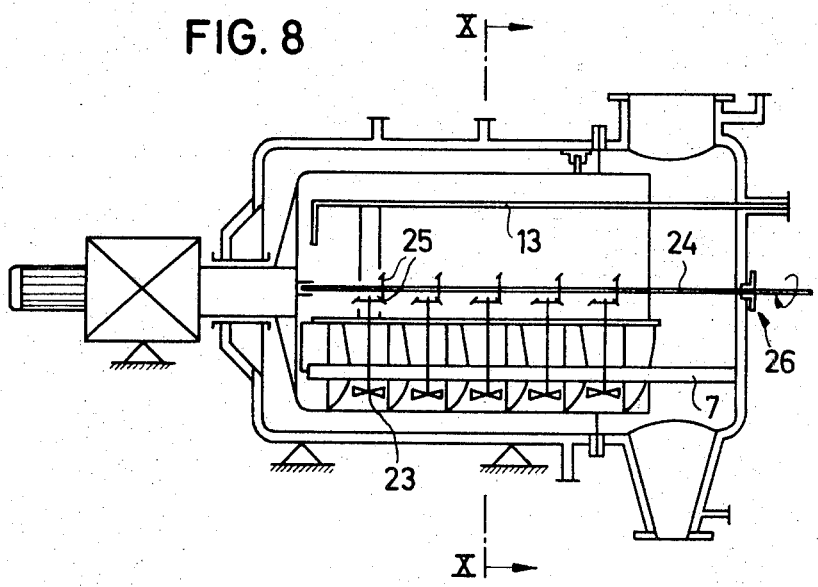

3,528,782
POLYCONDENSATION REACTOR
Karl-Heinz Riggert, Oberstedten, Taunus, and Ernst-Guenter Kunze, Frankfurt am Main, Germany, assignors to Vickers-Zimmer Aktiengesellschaft, Planung und Bau von Industrieanlagen
Filed May 10, 1968, Ser. No. 728,111
Claims priority, application Germany, May 19, 1967, V 33,663
Int. Cl. B01j 1/00
U.S. Cl. 23—286         13 Claims

ABSTRACT OF THE DISCLOSURE

An apparatus for the polycondensation reaction for making linear high-polymers having a rotatable cylindrical reactor which contains a plurality of stationary and substantially parallel partitions in the form of chordal segments of a helix to give a plowshare type action when said reactor is rotated.

---

The invention relates to an apparatus for carrying out the poly-condensation reactions in the continuous production of linear high polymers, especially for the final polycondensation reaction in the production of polyesters.

The production of film and thread-forming polyesters had its start, as is well known in the early 1940's from an invention which is described, for example, in German Pat. 972,503. According to this description, high polymer polyesters are obtained by (1) the reaction of a glycol of the general formula $HO(CH_2)_nOH$ with terephthalic acid (TPA) or a low aliphatic ester of terephthalic acid, and (2) the subsequent polycondensation of the resulting intermediate product. Special economic importance has been established by the polyethylene terephthalate produced from ethylene glycol and dimethyl terephthalate through the ester interchange product bis-2-hydroxy-ethyl-terephthalate.

At the present time, it is possible to produce terephthalic acid in sufficient purity for the production of high-quality polyester threads and films by the direct esterification method. Such a direct esterification process, on an industrial scale, is more economical than the prior art method where an ester interchange step is required.

The batch-wise production of polyesters by the direct esterification method, on a large industrial scale, has now been substantially mastered and it is, by and large, the most frequently employed method. However, the conversion of the process into a continuous operation is very desirable because of the obvious disadvantages of the batch-type operation. It is only very recently that some use is made of continuous processes, on a large scale, for the direct esterification of TPA. A cause for this is to be seen in the requirement of maintaining a number of reaction parameters at exact and predetermined levels. This requirement is further complicated by the fact that some of the parameters, for example, pressure and temperature, must be modified as the polycondensation reaction progresses, according to a definite program, over a long period of time, in order to achieve a product of constantly high quality. Difficulties also arise through the necessity of: maintaining as constant as possible the residence times of the reactants in a narrow time range, in the interest of uniformity in the degree or completeness of the condensation reaction; the evaporation of liberated reaction products in a short time; providing a good thorough mixing of the reaction composition under steady and constant renewal of surface, especially during the polycondensation; and maintaining a constant concentration of reactants and catalysts.

Continuous process for polyester production described in the prior art (for example, U.S. Pats. 2,727,882; 2,933,476; 2,973,341; 3,054,776) are, as a rule designed in a number of stages. A continuous process developed by the assignee of the present application, which was carried out with success on a large industrial scale, operates with one ester-interchanged stage and two or three polycondensation stages. In view of the aforementioned elements on a continuous production process, it is clear that the designing of reactors capable of successful industrial operation in continuous processes is of considerable importance. This is especially true of the final polycondensation reactor, which exerts the final influence on the quality of the product.

Polycondensation reactors, in various structural forms, which satisfy one or more of the requirements placed on them are known. However, such known reactors do not satisfy all of the requirements indicated above. These known apparatus have in common the use of a pair of horizontally driven shafts with plate or agitating elements arranged interacting on the shaft-pair (U.S. Pat. 2,758,915, German published application 1,213,115). The double worm apparatus disclosed in French Pat. 1,351,484, also belongs in this category and which, despite its indisputable advantages, has the disadvantage of being expensive.

The German Pat. 1,207,349 seeks to overcome these disadvantages by an apparatus which consists essentially of a horizontally arranged cylindrical drum, rotatable on its longitudinal axis, heating arrangements for the drum, a precondensate inlet on one end of the drum, a product outlet at the other end of the drum, a connection on the drum for communication with a vacuum source, and separating walls for the creation of a plurality of reaction zones communicating with one another during the rotation of the drum. The partitions in this cascade-type apparatus are either closed circular ring plates, which allow the reaction composition to flow thereover, or circular ring plates designed with a radial slit provided for the passage of the product.

In this known cascade-type reactor there are provided between the individual partitions spherical roller elements or bodies, such as balls, which are intended to constantly renew the layers of the reaction composition near the wall by their mixing effect. However, the balls fulfill this function extremely incompletely, because in the rotation of the drum they roll substantially only on circumferential lines, and the position of these lines is left to mere chance. At low circumferential speeds of the drum, the balls cannot exert any appreciable mixing effect due to the high viscosity of the reaction composition. Furthermore, there is no appreciable forced conveyance of the reaction composition to advance the same from reaction zone to reaction zone—a drawback which affects most of the known polycondensation reactors. The lack of any forced conveyance leads to uncontrolled and long staying times of the composition particles in the individual zones. Such non-control results in a broad staying time range which precludes a uniform degree of condensation of the product. In addition, a stationary layer of the reaction composition tends to adhere to the drum wall when the drum is rotated, and this layer is not removed from the drum wall when the rotation of the drum agitates the main body of the reaction mixture. For this reason, in the known reactors means are provided to discontinue the heat supply in the drum at a level above the surface level of the reaction composition. Aside from the fact that such an arrangement requires an especially complicated heating installation and can lead to undesired heat tensions in the drum body, there is the disadvantage of losing the highly effective polycondensation normally associated with a thin layer.

The principal object of the present invention, which may be regarded as an improvement of the invention disclosed in German Pat. 1,207,349, is to overcome the drawbacks of this type of reactor. More particularly it is an object of the invention to provide a drum reactor which makes possible a narrow residence time range, through mixing of the reaction composition, and the use of inner drum surface for the reaction in a thin layer without the necessity of partial interruption of the heat supplied to the reacting mixture. Further objects of the invention can be gathered from a reading of the following description.

The above objects are accomplished by providing a rotating drum type reactor having partitions which act as stationary guide plates, relative to the rotating drum, lying against the inside wall of the drum in the lower portion or zone of the drum. These stationary guide plates are positioned in the manner of plowshares with respect to the drum circumference. In such a reactor, the reaction composition adhering as a layer on the smooth inner wall of the drum is forcibly conveyed, by the fixed-position guide plates during the drum rotation, successively from reaction zone to reaction zone. In such a reactor, the boundaries of the reaction zones are prescribed essentially by the guide plates which are obliquely positioned, in the manner of plowshares, relative to the inside wall of the drum. The guide plates, in addition to their conveyance function, strip off the inside wall of the drum in each revolution, so that the layer of the reaction composition is constantly renewed and thoroughly mixed. In this manner, overheatings of any part of the reaction mixture are prevented.

The obliquely set guide plates are advantageously arranged at such distances apart from one another that adjacent plowshare paths on the drum interior wall lie immediately adjacent to one another. Preferably, such adjacent paths overlap each other. In this fashion, it is assured that the reaction composition adhering as a layer on the inside wall of the drum is continuously conveyed further through the drum after each drum revolution by adjacent guide plates. This continuously forced conveyance leads to advantageously narrow-ranged residence times.

In a preferred embodiment of the invention, the drum is open at its product discharge end and is surrounded on all sides by a substantially correspondingly shaped stationary heating jacket. The heating jacket, arranged at such a distance from the outer drum wall so that the drum rotation is not impeded, transfers the heat needed for the reaction very uniformly by radiant heat transfer.

The invention will be described in further detail with the aid of the drawings in which:

FIG. 5 shows a vertical section view of a further example of the reactor according to the invention;

FIG. 6 shows a section view along the line VI—VI in FIG. 5;

FIG. 7 shows a section view along the line VII—VII in FIG. 5;

FIG. 8 shows a section view similar to FIG. 5, with added agitating elements;

Figure 1:
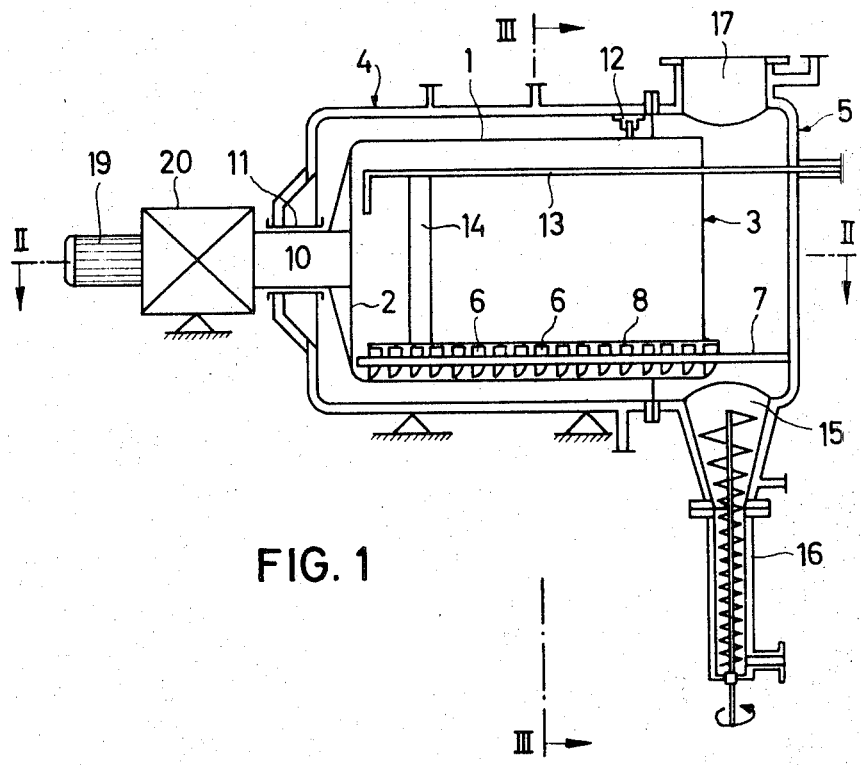
FIG. 1 shows a vertical section view of a reactor according to the invention.
Figure 2:
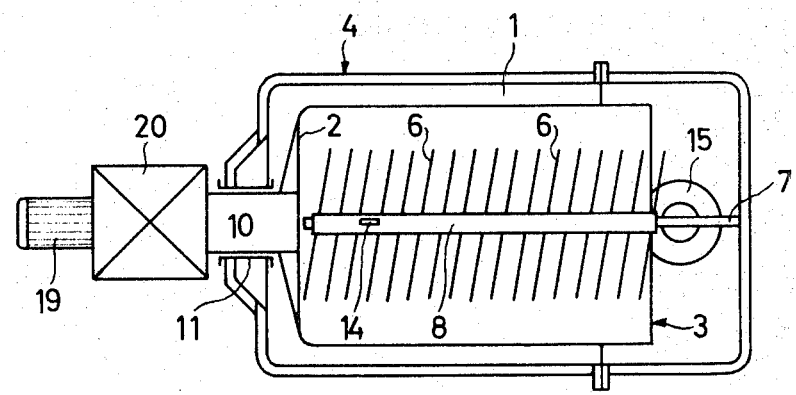
FIG. 2 shows a section view along the line II—II in FIG. 1.
Figure 3:
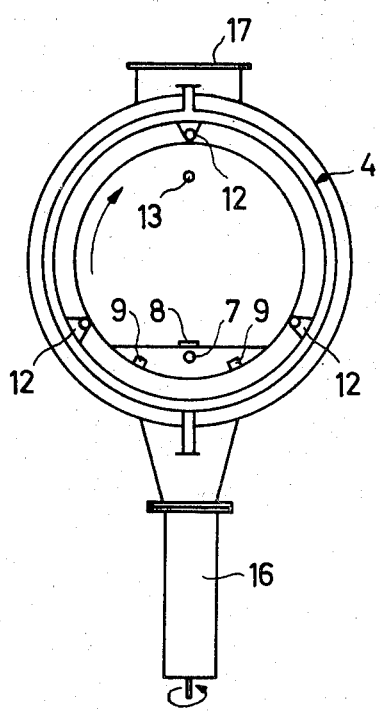
FIG. 3 shows a section view along the line III—III in FIG. 1.

Referring to FIGS. 1 to 3, the horizontally positioned drum 1, which is closed on its product inlet end by a wall member 2 and is open on its product outlet end 3, is surrounded on all sides by an essentially correspondingly cylindrical shaped double-walled heating jacket. The heating jacket is made of two parts 4 and 5, which are flanged together. The heating is carried out by a suitable vapor or liquid heat transfer medium, for example, biphenyl, which is supplied and withdrawn through the fitting elements shown in the drawings. The heat can, however, also be supplied either partially or entirely by resistance heating elements which may be positioned around the jacket. If resistance heating is to be used for the entire heat requirement, the heating jacket need not be constructed with double walls. Other known stationary heat radiators are likewise suitable for the heating operation.

In the lower portion of the drum 1 there are shown the stationary guide plates or partitions 6 which, during the rotation of the drum, scrape the inside circumferential wall surface area of the drum in plowshare paths, as more clearly illustrated in FIG. 2. The obliquely set guide plates 6, insofar as they touch the inside wall of the drum, have edges with elliptical cross sections. The connection of the guide plates with each other and with the stationary heating jacket 5 is through a beam-type overhang construction which extends into the drum 1 from its open side 3. This consists essentially of a tubular member 7, which may be heated to transfer heat to the guide plates by heat conduction. This heating can be done in a more effective manner by providing guide plates with double walls having hollow spaces therein-between communicating with the heating chamber of the tube 7. For the supplementary support of the guide plates with respect to each other, there may be provided one or more bracing members 8. The guide plates may be also connected to each other by structural members 9. Structural or connecting members 9, which may be bars, plates or the like are at least partially immersed in the reaction mixture in order to bring about additional mixing effect and to promote surface renewal. For reasons of simplification, members 9 are shown only in FIG. 3.

The drum 1 is firmly connected, at its inlet end, to a drive shaft 10, which extends through a vacuum-tight bearing element 11 and through the heating jacket 4. At its other end, the drum is guided in the vicinity of its product outlet by a plurality of carrier rollers 12 distributed over its outside circumference. FIG. 3 shows a prefered embodiment having three carrier rollers with an angular spacing of 120° between the rollers.

The precondensate inlet comprises a feed tube 13 conducted through the heating jacket 5 and extending into the drum 1 from its open side 3. Tube 13 terminates at a point before the first guide plate. The feed tube 13 is supported on its terminal end by means of a bar 14, which is attached to tubular member 7 and bracing member 8.

In the area below the open drum end 3, the heating jacket 5 is shaped into a product receiving and discharging member 15 of essentially conical and tapered form. A product discharge worm device 16 is fastened to the lower end of the member 15 by flanges, as shown in FIG. 1. On the heating jacket, located diametrically opposite the member 15, is a connecting member 17 for communication with a vacuum source to provide sub-atmospheric pressure for the reactor and for the withdrawal of the liberated reaction products.

Figure 4:
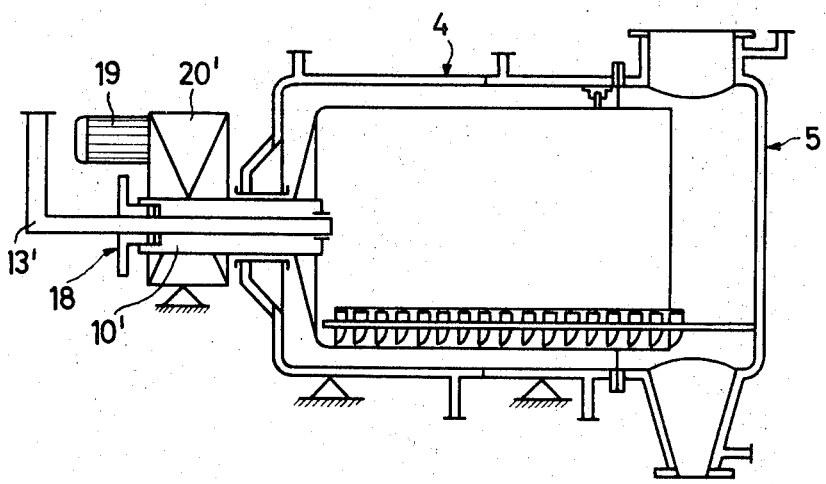
FIG. 4 shows a reactor similar to that in FIG. 1 but with a different precondensate feed construction.

In the embodiment shown in FIG. 4, the precondensate inlet is a feed tube 13' conducted through the drive shaft 10' over a vacuum-tight stuffing box arrangement 18. The heating jacket 4 shown in FIG. 4 is subdivided into two independent heating chambers, so that there are provided altogether three heating jacket sections, namely two in the heating jacket portion 4 and one in the heating jacket portion 5. Such an arrangement makes possible the heating of different portions of the reactor drum at differing temperatures. Obviously, there can be provided a larger number of separate heating jacket sections, and this can be provided generally for any of the reactors according to the invention.

The guide plates 6 in the reactors shown in FIGS. 1 to 4 suitably have a height of about ⅙ to ½, preferably ¼ to ⅓, that of the cylinder diameter. For the avoidance of deposits of the reaction composition on the guide plates, plate height and the layer thickness of the reaction composition on the inside wall of the drum can be adjusted in such a way that there occurs a partial overflowing of the guide plates in the axial direction of the drums as a result of the accumulation of the reaction composition on the guide plates. For the same reason the connecting tube 7 also can be arranged to immerse into the reaction composition.

The drive of the drum 1 on the shaft 10 or 10' is accomplished by an electric motor 19 and a regulating gear 20 or 20', respectively. The reactor jacket 1 and the motor-and-gear arrangement rest on suitable stationary supports.

For further explanation of the manner of operation of the reactor so far described, reference is made to the following example.

In a reactor according to FIGS. 1 to 3, having a drum length of 3 meters, a drum diameter of 1 meter, a guide plate length of 0.3 meter and a setting angle of the guide plates 6 to the drum axis of 80°, there were fed through the feed tube 13 46 kg. per hour of a precondensate of polyethylene therephthalate with a solution viscosity $n_{intr.} = 0.47$ (measuring method: concentration 0.5 g. precondensate to 100 ml. of solvent; measuring temperature 20 C.; solvent phenol and tetrachloro-ethane in the ratio of 60:40; measuring apparatus Ostwald viscosimeter). The wall temperatures of drum 1 were: 275° C. in the first half of the drum and 280° C. in the second half of the drum. The drum rotated at a circumferential velocity of 3.8 m./min and the layer thickness on the inside wall of the drum, which because of the low circumferential velocity of the drum was determined solely by the amount of precondensate feed, amounted to 1.5 cm. During the post-condensation period, there was maintained a vacuum of approximately 1 torr.

The precondensate was conducted by the rotation of the drum on approximately circular paths on the inner drum wall upward and finally downward again and thereupon met by the first obliquely set guide plate. The precondensate was then pushed in axial direction and displaced about one guide plate width (as seen in projection direction) to the right onto the next plowshare path, whereupon the process was repeated, until the entire length of the drum was covered. After a residence time of about 4 hours, the product was pushed out by the guide plate situated at the drum opening 3, dropped into the discharge member 15 and from there discharged from the reactor by means of the discharge worm 16. The solution viscosity at the reactor output end amounted to $n_{intr.} = 0.85$. The product could be immediately spun into high-quality threads and stretched.

The residence time of the reaction composition in the reactor depends exclusively on the inner surface of the drum, the circumferential speed of the reaction composition (which, with the rising movement through reflux, remains lower than the rate of the drum rotation) the guide plate length and the guide plate setting angle. By adjustment of the turning rate of the drum, the layer thickness can be regulated.

In the event that longer residence times are desired, the reactor according to the invention can be constructed in a cascade manner, as shown in FIGS. 5 to 11, by fastening compression or baffle plates 21 between adjacent guide plates. Between the baffle plate and the inside wall of the drum, there is a gap 22 (FIG. 7) which determines the layer thickness of the reaction composition on the drum wall. In this variant of the reactor according to the invention, the guide plates are made higher, so that their height corresponds to about one half the diameter of the drum. In this manner, the chambers formed by the neighboring guide plates are made to hold a greater volume of the reaction composition. As is well known, as the chamber volume increases, the residence time also increases.

The manner of operating the reactor illustrated in FIGS. 5 to 7 is similar to that which was described with reference to FIGS. 1 to 4. Through the rotation of the drum the melt is again conducted upward in a thin layer and thereupon downward and conveyed in each case to the next plowshare path in axial direction, which is passed over by the next guide plate, with positive guidance, until all the guide plates and all the reaction chambers have been passed through by the reaction composition. Between the individual guide plates, however, the reaction composition stays for a longer time before it passes through the gap 22 and executes the next revolution.

Figure 10:
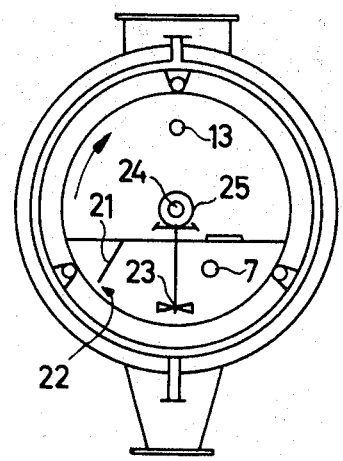
FIG. 10 shows a section view along the line X—X in FIG. 8.

To increase the mixing effect within the reactor, there can be expediently provided between the guide plates horizontal and/or vertical active agitating elements with group or individual drive means. FIGS. 8 and 10 show agitating elements constructed as wing agitators 23, which are driven in groups by a drive shaft 24 and bevel wheel pairs 25. The drive shaft 24 is here led through the heating jacket 5 to the outside over a vacuum-tight stuffing box 26.

Figure 9:
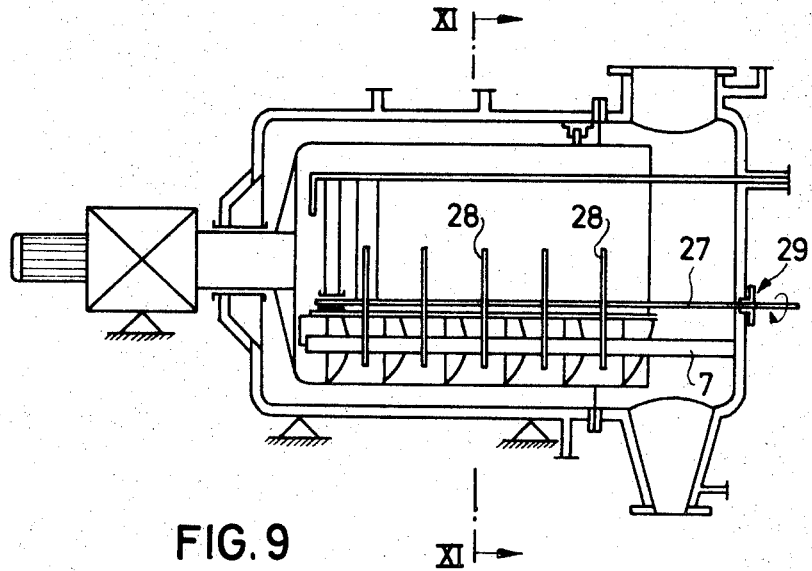
FIG. 9 shows a section view similar to FIG. 8, with modified agitating elements.
Figure 11:
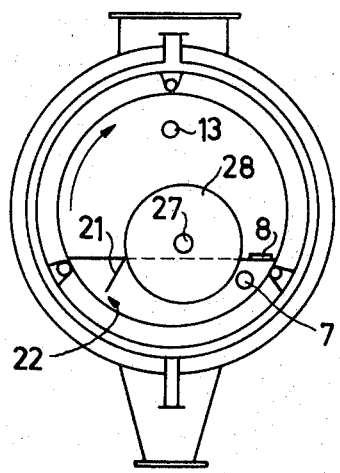
FIG. 11 shows a section view along the line XI—XI in FIG. 9.

In the reactor according to FIGS 9 and 11 there are used as agitating elements disk agitators 28 fastened to a shaft 27, which also provide for an additional agitation of the reaction composition for the purpose of thoroughly mixing particles of a higher degree of polycondensation with those of a lower degree of polycondensation. In this case, too, the shaft 27 is conducted through the heating jacket by way of a vacuum-tight sealing element 29.

The partitions or guide plates 6 obtain their plowshare type action by being positioned in the form of chordal segments of a helix, as shown in the drawings. It is to be noted that the top edge configuration of these partitions is not critical: the top edge of these partitions may be flat or curved.

The invention has been described in detail with particular reference to preferred embodiments thereof, but it will be understood that variations and modifications can be effected within the spirit and scope of the invention as described hereinabove and as defined in the appended claims.

What is claimed is:

1. An apparatus for the polycondensation reaction in the continuous production of linear high polymers, which comprises a horizontally disposed cylindrical reactor rotatable on its longitudinal axis, means for rotating said reactor, heating means for said reactor, a precondensate inlet at one end of said reactor, a product outlet at the other end of said reactor, means on said reactor communicating with a pressure reducing means, and a plurality of stationary and substantially parallel partitions substantially transversely disposed within said reactor, said partitions being positioned near the bottom of the reactor in the form of chordal segments of a helix to give a plowshare type action when said reactor is rotated to move material axially from said inlet end to said outlet end of said reactor.

2. An apparatus according to claim 1 wherein said partitions being so positioned that the path of one partition on the inside wall of said reactor touches the path of an adjacent partition.

3. An apparatus according to claim 1 further comprising connecting members each of which is attached to at least two adjacent partitions and at least partially immersed in the reaction mixture in said reactor.

4. An apparatus according to claim 1 further comprising baffle plates longitudinally disposed with respect to said reactor and each of which is attached to at least two adjacent partitions, said baffle plates forming a clearance with the reactor wall to allow a layer of the reaction mixture having a predetermined thickness to form on said wall.

5. An apparatus according to claim 4 further comprising mixing means positioned between said partitions.

6. An apparatus according to claim 1 wherein said reactor being closed at its inlet end and open at its outlet end, said heating means being a stationary heating jacket, and said reactor being encased within said stationary heating jacket.

7. An apparatus according to claim 6 wherein said precondensate inlet is a feed tube conducted through said heating jacket and extending into said reactor from its open end, said feed tube terminating at a point between said closed end of said reactor and said partitions.

8. An apparatus according to claim 6 wherein said heating jacket having a discharging port and a port for connecting the reactor to a source of vacuum at the open end of the reactor.

9. An apparatus according to claim 6 wherein said means for rotating said reactor comprises a rotatable shaft extending through a vacuum-sealing bearing element mounted on said heating jacket to be attached to said closed end of the reactor, means for rotating said shaft, and a plurality of carrier rollers mounted between the exterior surface of said reactor and the interior surface of said heating jacket near the open end of the reactor for supporting the reactor in rotation.

10. An apparatus according to claim 9 wherein said precondensate inlet is a feed tube, said rotatable shaft being tubular, said feed tube being disposed within said tubular shaft and extending into said reactor through a port on the closed end of said reactor.

11. An apparatus according to claim 6 wherein said partitions being mounted on a boom extending through said heating jacket into said reactor from its open end.

12. An apparatus according to claim 11 wherein said boom being a heated tube.

13. An apparatus according to claim 12 wherein each of said partitions having double walls with a cavity thereinbetween, said cavity communicating with the interior of said heated tube.

References Cited

UNITED STATES PATENTS

| | | | |
|---|---|---|---|
| 1,353,463 | 9/1920 | Dyer | 23—269 |
| 1,775,017 | 9/1930 | Carleton. | |
| 2,758,915 | 8/1956 | Vodonik | 23—285 |
| 3,248,180 | 4/1966 | Kilpatrick | 23—285 |

MORRIS O. WOLK, Primary Examiner

D. G. MILLMAN, Assistant Examiner

U.S. Cl. X.R.

259—3